US012657349B2

(12) United States Patent
Kong et al.

(10) Patent No.: US 12,657,349 B2
(45) Date of Patent: Jun. 16, 2026

(54) PROTECTING KEYSTROKES IN MULTI-SESSION-ENABLED SYSTEMS

(71) Applicant: Omnissa, LLC, Mountain View, CA (US)

(72) Inventors: Xiaoyu Kong, Beijing (CN); YiQun Yun, Beijing (CN); ZhangLin Zhou, Beijing (CN); Yang Yu, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 150 days.

(21) Appl. No.: 18/467,831

(22) Filed: Sep. 15, 2023

(65) Prior Publication Data

US 2025/0021703 A1 Jan. 16, 2025

(30) Foreign Application Priority Data

Jul. 14, 2023 (WO) ................ PCT/CN2023/107426

(51) Int. Cl.
*G06F 21/83* (2013.01)
*G06F 21/60* (2013.01)

(52) U.S. Cl.
CPC ............ *G06F 21/83* (2013.01); *G06F 21/602* (2013.01)

(58) Field of Classification Search
CPC ............................. G06F 21/83; G06F 21/602
See application file for complete search history.

(56) References Cited

U.S. PATENT DOCUMENTS 6,677,933 B1 * 1/2004 Yogaratnam ............ G06F 9/451
345/174
7,774,595 B2 * 8/2010 Chung Geon .......... G06F 21/83
726/16

(Continued)

FOREIGN PATENT DOCUMENTS

KR        2002-0048313 A        6/2002
KR        2004-0009575 A        1/2004
WO          2018078212 A1        5/2018

OTHER PUBLICATIONS

Unknown, "Keyboard Input Overview", Microsoft, Apr. 3, 2023, retrieved Sep. 15, 2023, https://learn.microsoft.com/en-us/windows/win32/inputdev/about-keyboard-input, 21 pages.

(Continued)

*Primary Examiner* — Rupal Dharia
*Assistant Examiner* — Devin E Almeida
(74) *Attorney, Agent, or Firm* — Kim & Stewart LLP

(57) ABSTRACT

Encrypting keystroke data in a multi-session-enabled computing device includes receiving a first control message requesting enabling of keystroke encryption for a protected application executing in a first desktop session. The first control message includes application identification information of the protected application. Keystroke encryption is enabled for keystrokes targeting the first desktop session based on receipt of the first control message. Keystroke data sent to the protected application is encrypted while the protected application maintains keyboard focus in the first desktop session. Unencrypted keystroke data is transmitted to another application of a second desktop session while keystroke encryption is enabled for the protected application in the first desktop session.

14 Claims, 6 Drawing Sheets

(56) References Cited

U.S. PATENT DOCUMENTS

| | | | |
|---|---|---|---|
| 11,550,922 | B2 | 1/2023 | Soman et al. |
| 12,032,726 | B1 * | 7/2024 | Tas ........................... G06F 21/83 |
| 2007/0013673 | A1 * | 1/2007 | Minari .................. G06F 3/0238 |
| | | | 345/173 |
| 2007/0182714 | A1 * | 8/2007 | Pemmaraju ........... H04L 9/0825 |
| | | | 345/168 |
| 2008/0028441 | A1 * | 1/2008 | Novoa ..................... G06F 21/83 |
| | | | 726/4 |
| 2009/0125646 | A1 * | 5/2009 | Rosenan ............... G06F 21/606 |
| | | | 710/15 |
| 2009/0296928 | A1 | 12/2009 | Matsumoto et al. |
| 2010/0195825 | A1 | 8/2010 | Cini |
| 2012/0079282 | A1 | 3/2012 | Lowenstein |
| 2015/0135200 | A1 * | 5/2015 | Pajuelo ............... G06F 9/44521 |
| | | | 719/328 |
| 2016/0371472 | A1 | 12/2016 | Walsh |
| 2017/0104597 | A1 | 4/2017 | Negi et al. |
| 2017/0286141 | A1 | 10/2017 | Adler et al. |
| 2018/0026947 | A1 | 1/2018 | Haworth et al. |
| 2019/0370013 | A1 | 12/2019 | Katchapalayam |
| 2020/0042749 | A1 * | 2/2020 | Richardson ............... G06F 8/38 |
| 2020/0104538 | A1 | 4/2020 | Summers et al. |
| 2021/0216644 | A1 | 7/2021 | Soman et al. |
| 2022/0092221 | A1 * | 3/2022 | Scillieri .............. H04L 63/0428 |
| 2022/0140995 | A1 * | 5/2022 | Gehtman .............. G06F 21/566 |
| | | | 713/165 |
| 2022/0245287 | A1 * | 8/2022 | Fernandez .......... G06F 13/4282 |
| 2023/0013844 | A1 * | 1/2023 | Gardiner ............... G06F 21/572 |
| 2024/0249033 | A1 * | 7/2024 | Cook ...................... G06F 21/83 |

OTHER PUBLICATIONS

Oglesby, Ron, "A look at the VMware Horizon key logger blocker—Ron's Cool Feature of the Week", VMware, Jan. 27, 2022, retrieved Sep. 15, 2023, https://blogs.vmware.com/euc/2022/01/a-look-at-the-vmware-horizon-key-logger-blocker-rons-cool-feature-of-the-week.html, 4 pages.

Lohr et al., "Windows Enterprise multi-session FAQ", Microsoft, retrieved Sep. 15, 2023, https://learn.microsoft.com/en-us/azure/virtual-desktop/windows-multisession-faq, 7 pages.

Walker et al., "Fast User Switching Article", Microsoft, Jan. 7, 2021, retrieved Sep. 15, 2023, https://learn.microsoft.com/en-us/windows/win32/shell/fast-user-switching, 2 pages.

Marcho, Craig, "Application Compatibility—Session 0 Isolation", First published on TECHNET, Apr. 27, 2007, retrieved Sep. 15, 2023, https://techcommunity.microsoft.com/t5/ask-the-performance-team/application-compatibility-session-0-isolation/ba-p/372361, 6 pages.

Montoya et al., "Welcome to Remote Desktop Services Article", Microsoft Dec. 2, 2021, retrieved Sep. 15, 2023, https://learn.microsoft.com/en-us/windows-server/remote/remote-desktop-services/welcome-to-rds, 2 pages.

Lohr et al., "Remote Desktop Services roles", Microsoft, Sep. 20, 2021, retrieved Sep. 15, 2023, https://learn.microsoft.com/en-us/windows-server/remote/remote-desktop-services/rds-roles, 5 pages.

Viviano et al., "I/O request packets", Microsoft, Dec. 14, 2021, retrieved Sep. 15, 2023, https://learn.microsoft.com/en-us/windows-hardware/drivers/gettingstarted/i-o-request-packets, 2 pages.

Russinovich et al., "Windows Internals Part 1", Microsoft, 6th Edition, copyright 2012, retrieved Sep. 15, 2023, https://repo.zenk-security.com/Linux%20et%20systemes%20d.exploitations/Windows%20Internals%20Part%201_6th%20Edition.pdf, 752 pages.

Unknown, "Machine code", Wikipedia, retrieved Sep. 15, 2023, https://en.wikipedia.org/wiki/Machine_code, 8 pages.

Unknown, "x86 instruction listings", Wikipedia, retrieved Sep. 15, 2023, https://en.wikipedia.org/wiki/X86_instruction_listings, 74 pages.

Unknown, "X86 Opcode and Instruction Reference Home", retrieved Sep. 15, 2023, http://ref.x86asm.net/coder32.html#xE8, 7 pages.

Unknown, "Function pointer", Wikipedia, retrieved Sep. 15, 2023, https://en.wikipedia.org/wiki/Function_pointer, 7 pages.

Russinovich et al., "Windows Internals Part s", Microsoft, 6th Edition, copyright 2012, retrieved Sep. 15, 2023, https://repo.zenk-security.com/Linux%20et%20systemes%20d.exploitations/Windows%20Internals%20Part%202_6th%20Edition.pdf, 672 pages.

Pietrek, Matt, "Inside Windows an In-Depth Look into the Win32 Portable Executable File Format, Part 2", Microsoft Oct. 23, 2019, retrieved Sep. 15, 2023, https://learn.microsoft.com/en-us/archive/msdn-magazine/2002/march/inside-windows-an-in-depth-look-into-the-win32-portable-executable-file-format-part-2, 14 pages.

Unknown, "Dynamic-link library", Wikipedia, retrieved Sep. 15, 2023, https://en.wikipedia.org/wiki/Dynamic-link_library#Explicit_run-time_linking, 11 pages.

Unknown, "WM_SETFOCUS message", https://docs.microsoft.com/en-us/windows/desktop/inputdev/wm-setfocus, May 30, 2018; retrieved on Feb. 9, 2023, 2 pages.

Unknown, "Virtual-Key Codes", https://docs.microsoft.com/en-us/windows/desktop/inputdev/virtual-key-codes, May 31, 2018; retrieved on Feb. 9, 2023, 19 pages.

Unknown, "Window Messages", https://docs.microsoft.com/en-us/windows/desktop/learnwin32/window-messages, May 31, 2018; retrieved on Mar. 2, 2020, 5 pages.

Unknown, "WM_KEYDOWN message", https://docs.microsoft.com/en-us/windows/desktop/inputdev/wm-keydown, May 30, 2018; retrieved on Feb. 9, 2023, 3 pages.

Unknown, "WM_KILLFOCUS message", https://docs.microsoft.com/en-us/windows/desktop/inputdev/wm-killfocus, May 31, 2018; retrieved on Feb. 9, 2023, 2 pages.

Ogelsby, R., "A look at the VMware Horizon key logger blocker—Ron's Cool Feature of the Week ", https://blogs.vmware.com/euc/2022/01/a-look-at-the-vmware-horizon-key-logger-blocker-rons-cool-feature-of-the-week.html, VMware, Jan. 27, 2022, 9 pages.

Hex-Rays, "IDA Pro", https://hex-rays.com/ida-pro/, Hex-Rays, Copyright 2023, retrieved on Feb. 8, 2023, 12 pages.

Hex-Rays, "IDA Freeware", https://hex-rays.com/ida-free/, Hex-Rays, Copyright 2023, retrieved on Feb. 8, 2023, 8 pages.

Hex-Rays, "Interactive Operation", https://hex-rays.com/ida-free/, Hex-Rays, Copyright 2023, retrieved on Feb. 8, 2023, 9 pages.

Unknown, "CryptMT. The Cryptographic Mersenne Twister", http://www.math.sci.hiroshima-u.ac.jp/m-mat/MT/CRYPTMT/index.html, Japan Society for the Promotion of Science, retrieved on Feb. 8, 2023, 2 pages.

Unknown, "CryptMT", https://en.wikipedia.org/wiki/CryptMT, Wikipedia, retrieved on Feb. 8, 2023, 1 page.

Unknown, "Advanced Encryption Standard", https://en.wikipedia.org/wiki/Advanced_Encryption_Standard, Wikipedia, retrieved on Feb. 8, 2023, 14 pages.

Unknown, "AES implementations", https://en.wikipedia.org/wiki/AES_implementations, Wikipedia, retrieved on Feb. 8, 2023, 6 pages.

Unknown, "Keyboard_Input_Data structure (ntddkbd.h)", https://learn.microsoft.com/en-us/windows/win32/api/ntddkbd/ns-ntddkbd-keyboard_input_data, Microsoft, Aug. 3, 2021, Retrieved on Feb. 9, 2023, 2 pages.

Unknown, "Block cipher mode of operation", https://en.wikipedia.org/wiki/Block_cipher_mode_of_operation, Wikipedia, retrieved on Feb. 9, 2023, 20 pages.

Unknown, "Stream Cipher", https://en.wikipedia.org/wiki/Stream_cipher, Wikipedia, retrieved on Feb. 9, 2023, 7 pages.

Unknown, "Block cipher", https://en.wikipedia.org/wiki/Block_cipher, Wikipedia, retrieved on Feb. 9, 2023, 16 pages.

Unknown, "GDES", https://en.wikipedia.org/wiki/GDES, Wikipedia, retrieved on Feb. 9, 2023, 1 page.

Unknown, "Lucifer (cipher)", https://en.wikipedia.org/wiki/Lucifer_(cipher), Wikipedia, retrieved on Feb. 9, 2023, 2 pages.

Unknown, "Madryga", https://en.wikipedia.org/wiki/Madryga, Wikipedia, retrieved on Feb. 9, 2023, 2 pages.

Unknown, "Simon (cipher)", https://en.wikipedia.org/wiki/Simon_(cipher), Wikipedia, retrieved on Feb. 9, 2023, 6 pages.

Unknown, "Speck (cipher)", https://en.wikipedia.org/wiki/Speck_(cipher), Wikipedia, retrieved on Feb. 9, 2023, 7 pages.

Unknown, "Chosen-plaintext attack", https://en.wikipedia.org/wiki/Chosen-plaintext_attack, Wikipedia, retrieved on Feb. 9, 2023, 4 pages.

(56) References Cited

OTHER PUBLICATIONS

Unknown, "Chosen-ciphertext attack", https://en.wikipedia.org/wiki/Chosen-ciphertext_attack, Wikipedia, retrieved on Feb. 9, 2023, 3 pages.

Unknown, "Interactive Operation", Hex-Rays, copyright 2023, retrieved Mar. 26, 2023, https://www.hex-rays.com/products/decompiler/manual/interactive.shtml, 8 pages.

Unknown, "Hash Function Prospector", GitHub, Inc., copyright 2023, https://github.com/skeeto/hash-prospector, 10 pages.

* cited by examiner

500

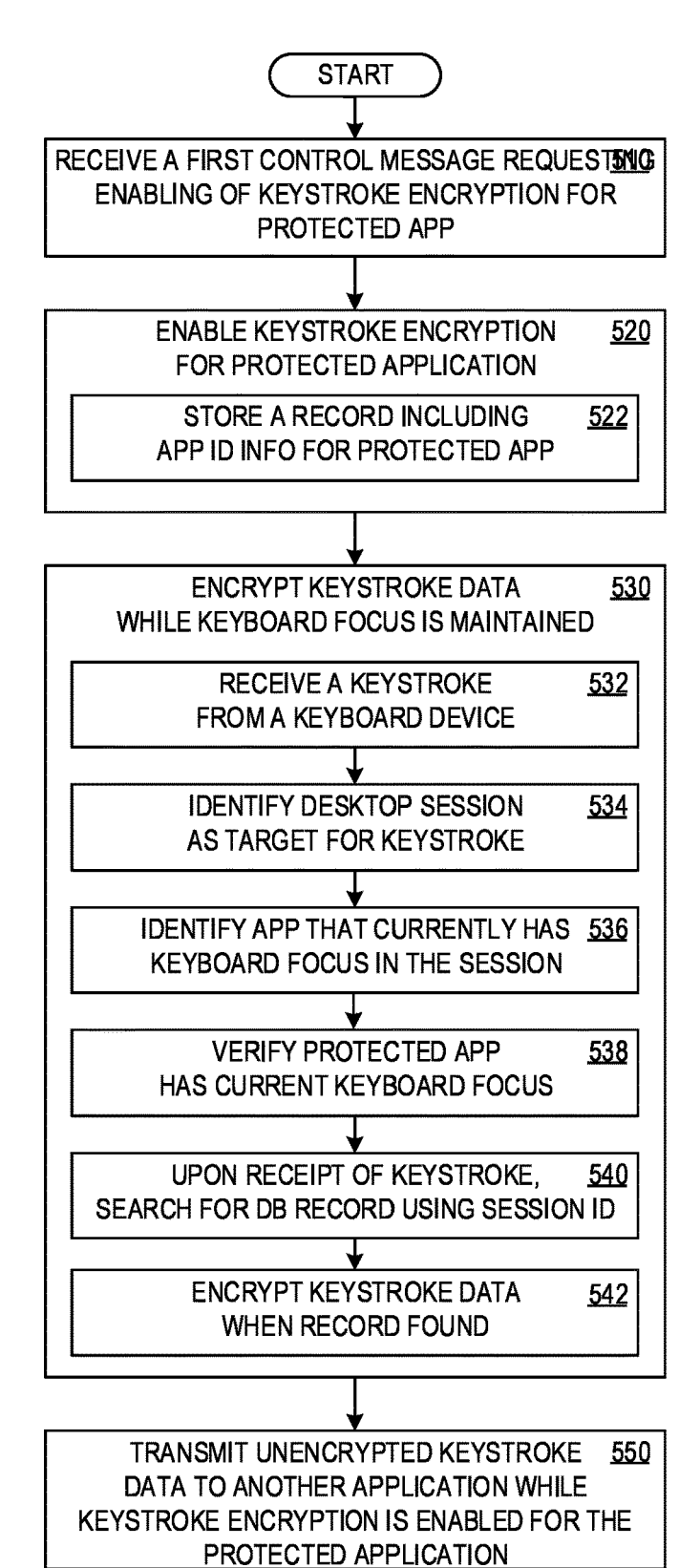

START

RECEIVE A FIRST CONTROL MESSAGE REQUESTING 510
ENABLING OF KEYSTROKE ENCRYPTION FOR
PROTECTED APP

ENABLE KEYSTROKE ENCRYPTION     520
FOR PROTECTED APPLICATION

STORE A RECORD INCLUDING     522
APP ID INFO FOR PROTECTED APP

ENCRYPT KEYSTROKE DATA     530
WHILE KEYBOARD FOCUS IS MAINTAINED

RECEIVE A KEYSTROKE     532
FROM A KEYBOARD DEVICE

IDENTIFY DESKTOP SESSION     534
AS TARGET FOR KEYSTROKE

IDENTIFY APP THAT CURRENTLY HAS     536
KEYBOARD FOCUS IN THE SESSION

VERIFY PROTECTED APP     538
HAS CURRENT KEYBOARD FOCUS

UPON RECEIPT OF KEYSTROKE,     540
SEARCH FOR DB RECORD USING SESSION ID

ENCRYPT KEYSTROKE DATA     542
WHEN RECORD FOUND

TRANSMIT UNENCRYPTED KEYSTROKE     550
DATA TO ANOTHER APPLICATION WHILE
KEYSTROKE ENCRYPTION IS ENABLED FOR THE
PROTECTED APPLICATION

Figure 6:
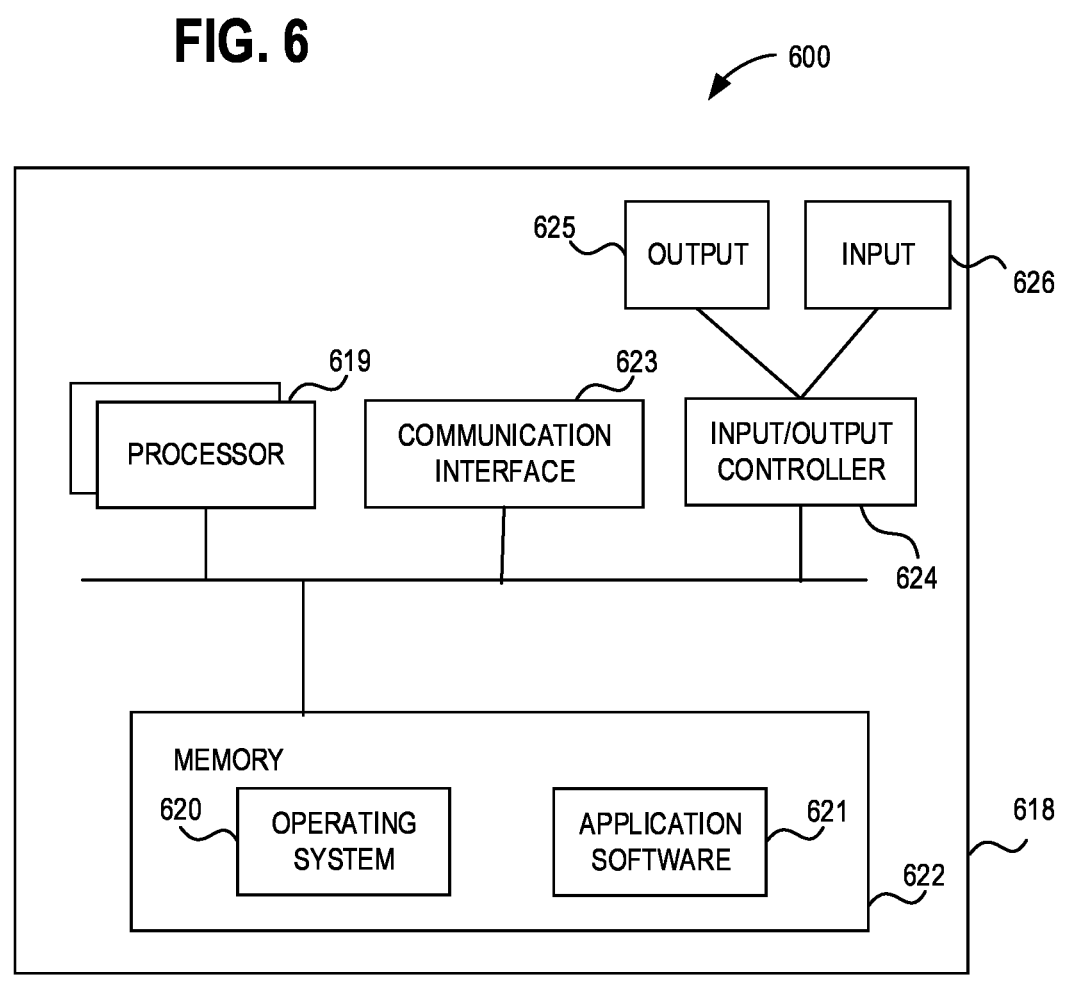

625 — OUTPUT

INPUT — 626

619 — PROCESSOR

623 — COMMUNICATION INTERFACE

INPUT/OUTPUT CONTROLLER

624

MEMORY

620 — OPERATING SYSTEM

APPLICATION SOFTWARE — 621

622

618

PROTECTING KEYSTROKES IN MULTI-SESSION-ENABLED SYSTEMS

BACKGROUND

Key logging is a process involving the capture of keystrokes made by a user via an input device, such as a physical keyboard. Software-based keyloggers are computer programs designed to record keyboard input without interrupting the input/output (I/O) flow between the input device and the application(s) that receive the input stream. Such keyloggers have been developed for various reputable uses, such as troubleshooting of technical problems with computers and their use within enterprise environments or monitoring computer usage in family settings. However, many nefarious uses of such keyloggers are possible. For example, keyloggers have been maliciously installed unbeknownst to users to steal passwords, credit card numbers, personal information, or otherwise illegally spy on users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide solutions for encrypting keystroke data in a multi-session-enabled computing device. Solutions include: receiving a first control message requesting enabling of keystroke encryption for a protected application executing in a first desktop session, the first control message including application identification information of the protected application; enabling keystroke encryption for keystrokes targeting the first desktop session based on receipt of the first control message; encrypting keystroke data sent to the protected application while the protected application maintains keyboard focus in the first desktop session; and transmitting unencrypted keystroke data to another application of a second desktop session while keystroke encryption is enabled for the protected application in the first desktop session.

BRIEF DESCRIPTION OF THE DRAWINGS

The present description will be better understood from the following detailed description read in the light of the accompanying drawings, wherein:

FIG. 5 illustrates a flowchart of exemplary operations associated with an example architecture, such as that shown in FIG. 3; and FIG. 6 illustrates a block diagram of an example computing apparatus that may be used as a component of an example architecture, such as that shown in FIG. 1.

Figure 1:
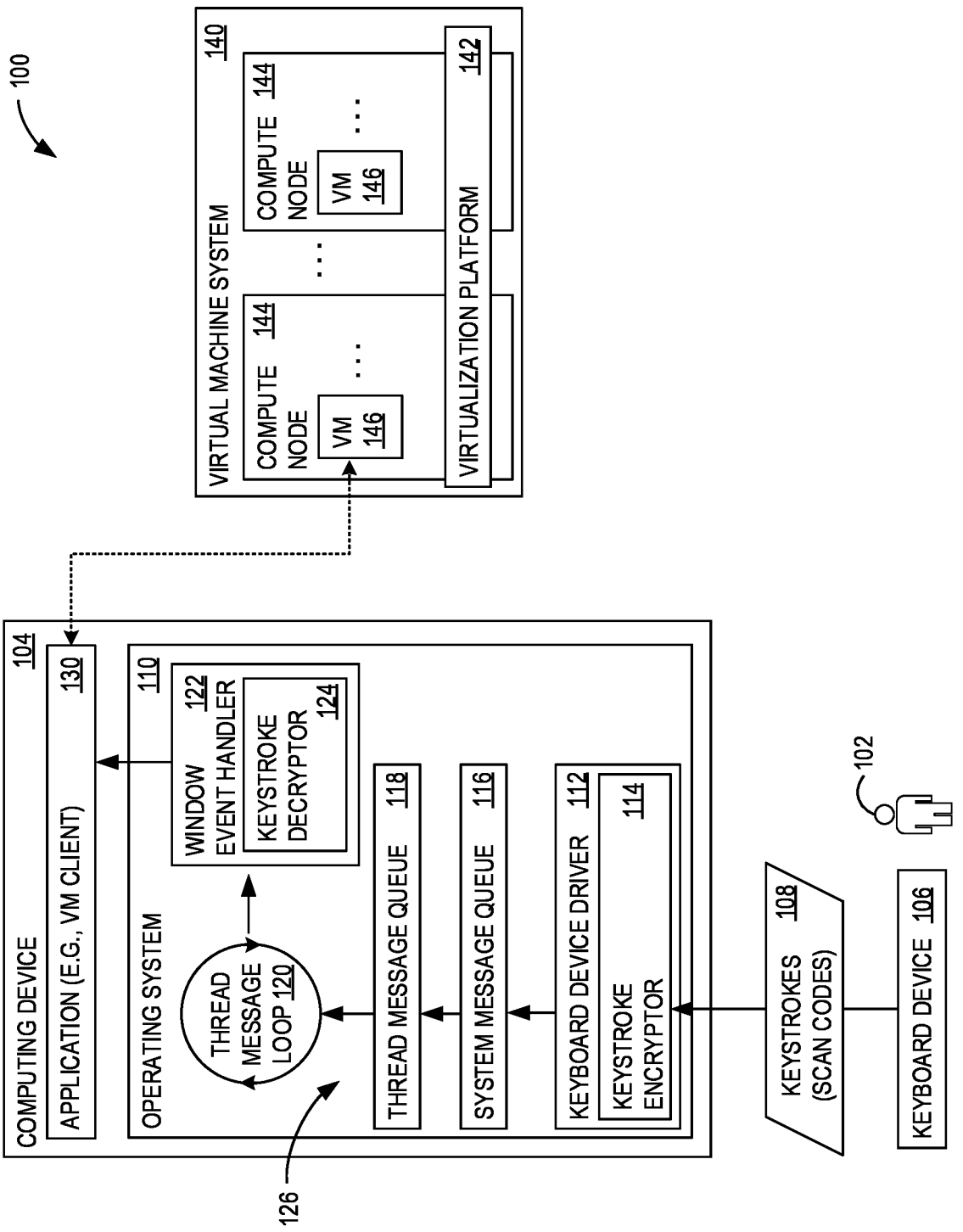
FIG. 1 illustrates an example architecture that advantageously provides encryption and decryption of keystroke data.

Any of the figures may be combined into a single example or embodiment.

DETAILED DESCRIPTION

In some examples, a keystroke encryptor is installed and used at a device driver level that allows a device driver to encrypt key identifiers (or "key IDs") in a very short cipher. This cipher segment is embedded within a keystroke message and sent, for example in a keystroke I/O message channel native to an underlying operating system of the computing device, from the device driver to a window event manager that is tasked with providing the keystroke data to whichever active window is currently receiving I/O from the input device. The window event manager may be a window procedure under Windows, a window event handling function under Linux or macOS, or the like. A decryptor (e.g., decryption module, engine, component, or the like) is installed and used by this window event handler 122 to decrypt the cipher segment, revealing the plaintext keystroke data, which is then passed onto the active window (e.g., for display, further processing, etc.). As such, keystroke data can be encrypted between an "entry point" of the keyboard device driver and an "exit point" where the keystroke data can be encrypted and passed to a target application or other application that currently has keyboard focus of the keyboard device. Such solutions allow the keystroke data to be encrypted through portions of the input flow process where keyloggers and other malicious malware typically practice their exploits.

However, some known operating systems and user interfaces, such as various versions of Microsoft Windows, support multiple concurrent sessions in which one or more users are simultaneously logged into desktops or other such system interfaces. In such architectures, the keystroke encryptor may be receiving keystroke data from multiple keyboards simultaneously, such as from different keyboards for different concurrent sessions. In such situations, keystroke data may or may not be encrypted among the active sessions. For example, one session may have a currently-focused protected application in which encryption is desired, but another session may have keyboard focus on an unprotected application in which keystroke encryption is not used.

Aspects of the disclosure provide a keystroke encryption system that can provide dynamic encryption of keystroke data in multi-session-enabled architectures. In examples, a keystroke encryption system is provided that supports multi-session-enabled architectures. A keystroke encryptor driver (or "keystroke encryptor") is installed to broker keystroke data between a keyboard device driver and the multiple sessions that consume such keystroke data. The keystroke encryptor maintains a state database that stores state data that tracks which particular applications (e.g., processes, threads) of which particular sessions are configured to receive encrypted keystroke data. When a protected application running in a desktop session receives keyboard focus (e.g., when the user brings a window of the protected application to the foreground), the protected application sends a control message to the keyboard encryptor to turn on encryption for keystrokes sent to this particular application (e.g, by session ID, process ID, and thread ID). When that protected application loses keyboard focus (e.g., when some other application is brought to the foreground), the protected application sends a control message to the keyboard encryptor to turn off encryption for this session. This encryption state tracking is done for each session independently, thus allowing the system to decide when to encrypt keystrokes for each particular session independently.

When keystroke input is requested from a particular session (e.g., to read keystrokes from the keyboard device via the keyboard device driver), the keystroke encryptor driver identifies the requesting session (e.g., by a unique session ID). The keystroke encryptor driver determines, from the state database, whether or not the keystroke data should be encrypted. For example, the keystroke encryptor driver determines whether or not the keyboard-focus of that particular session is currently focused on a protected application. If the requesting session currently is in a state of encryption (e.g., by a presence of the session ID of the requesting session), then the keystroke encryptor encrypts the next keystroke from the keystroke device driver for that session and responds to the input request with encrypted keystroke data. Likewise, if the requesting session is not in an encryption state, then the keystroke encryptor responds to the input request with unencrypted keystroke data. In some examples, the keystroke encryptor may perform a state determination at the time of the request to determine whether or not encryption should be enabled for this request. For example, upon receipt of an input request, the keystroke encryptor queries the session to identify which application (e.g., which process and thread) currently has keyboard focus. The keystroke encryptor searches the state database to identify whether or not there is a matching record (e.g., based on session ID and thread ID).

Aspects of the disclosure improve the functioning of the computer by protecting plaintext keystroke data from being snooped by software-based keyloggers as keystroke messages transit the native keystroke I/O message channel in multi-session-enabled operating systems. These techniques limit network traffic on the native I/O message channel by utilizing native I/O message channel protocols and fields for the cipher segment. This both (i) allows the feature to work within existing message sizes, thus not increasing the network packet size of I/O messages, as well as (ii) limits the scope of changes to the operating system to enable such features. Thus, aspects of the disclosure provide a practical, useful result to solve a technical problem in the domain of computing. Aspects of the disclosure further improve management of computing system resources, by only protecting keystroke data that is desired to be protected.

FIG. 1 illustrates an example architecture 100 that advantageously provides encryption and decryption of keystroke data. Architecture 100 uses a computing device 104 in conjunction with a keyboard device 106 which may be implemented on one or more computing apparatus 618 of FIG. 6. A keystroke encryptor 114 encrypts keystrokes 108 (e.g., scan codes, virtual-key codes, or the like), thus encrypting the keystrokes 108 as the keystroke data is passed through a keystroke I/O message channel 126, such as a channel native to, or otherwise part of, an operating system 110 of the computing device. In the example shown in FIG. 1, the operating system 110 is a version of MICROSOFT WINDOWS (Microsoft Corporation, Redmond, Washington). In other examples, the client operating system 110 is another operating system such as another desktop or server-based operating system (e.g., MACOS (Apple Inc., Cupertino, California), CHROMEOS (Google LLC, Mountain View, California), Unix, Linux, or the like) or a mobile operating system (e.g., Android, IOS (Apple, Inc.), CHROMEOS, or the like).

In operation, a user 102 operates the keyboard device 106 as an input device to the computing device 104. In some examples, the computing device 104 is a desktop or laptop computer and the keyboard device is a physical keyboard device, such as a QWERTY keyboard device or a French AZERTY keyboard device connected via a wired or wireless connection with the computing device 104. In other examples, the computing device 104 is a mobile computing device and the keyboard device 106 is a virtual keyboard device (e.g., a keyboard displayed on a touch screen of a mobile device).

Each time a key on the keyboard device 106 is pressed (and, in some configurations, released) by the user 102, the keyboard device 106 transmits keystroke data (e.g., keystrokes 108, in the form of scan codes or the like generated by the keyboard device 106) to a keyboard device driver 112 of the client operating system 110. Each keystroke 108 can include a scan code, a unique value that identifies which particular key was pressed or released during a given input event (e.g., independent of an active keyboard layout being used by the client operating system 110).

In conventional architectures, the keyboard device driver 112 interprets the scan code and converts the scan code to a virtual-key code, a device-independent value defined by the computing device 104 that identifies a particular purpose of each key. The keyboard device driver 112 then creates a keystroke message that includes the scan code (in plaintext form) and transmits that message through the keystroke I/O message channel 126. This message channel 126 includes a system message queue 116, a thread message queue 118, and a thread message loop 120 that are collectively configured to deliver keystroke messages to applications 130 running on the computing device 104 via a window event handler 122 (e.g., window procedure under Microsoft Windows, a window event handling function under Linux or macOS, or the like). However, keyloggers can inspect keystroke messages as the messages pass through the channel 126, and thus the plaintext keystroke data is vulnerable to being read and inspected in such conventional architectures.

In contrast, the keyboard device driver 112 includes a keystroke encryptor 114 that is configured to encrypt the keystroke data as the keystroke message transits the keystroke I/O message channel 126 through to the window event handler 122, where a keystroke decryptor 124 is configured to decrypt the keystroke data before the window event handler 122 passes each keystroke on to some particular application 130. More specifically, a key identifier (e.g., a particular scan code or virtual-key code of a particular keystroke 108) is included in a cipher segment that is encrypted by the encryptor 114. This cipher segment (in encrypted form) is included as one field of a keystroke message, and another field that typically includes the plaintext key identifier is left empty (e.g., does not include the plaintext key identifier). As such, the cipher segment accompanies the keystroke message through the message channel 126 in an encrypted form, and any keylogger operating between the keyboard device driver 112 and the window event handler 122 can at best read an empty key identifier field of the message or an encrypted cipher segment.

Upon arrival at the window event handler 122, the keystroke decryptor 124 decrypts the cipher segment embedded in the keystroke message, thus identifying the key identifier (in plaintext). The window event handler 122 passes the plaintext key identifier to the application 130 as an input event to be processed by the application 130.

The application 130 may be any application, including virtualized and non-virtualized. In some examples, the application 130 is a virtual machine (VM) client that is configured to connect and communicate with a virtual machine 146 of a virtual machine system 140. The virtual machine system 140 provides a virtualization architecture that comprises of a set of compute nodes 144, where each compute node hosts multiple objects, which may be virtual machines 146 (e.g., VMs, such as base objects, linked clones, and independent clones), containers, applications, or any compute entity (e.g., computing instance or virtualized computing instance) supported by a virtualization platform 142.

Figure 2:
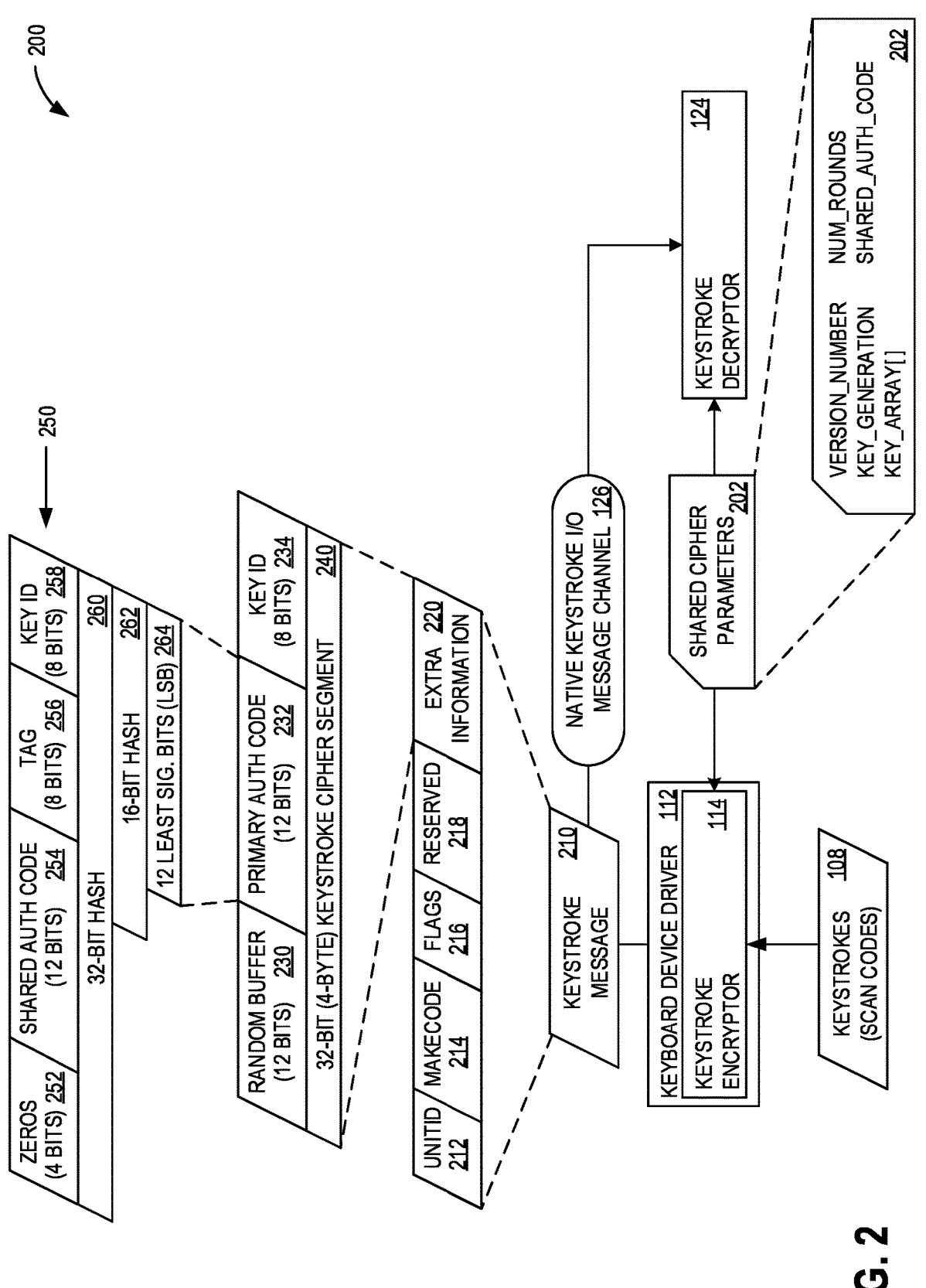
FIG. 2 illustrates an example data flow of a keystroke message through a native keystroke I/O message channel, such as the example shown in FIG. 1.

FIG. 2 illustrates an example data flow 200 of a keystroke message 210 through the native keystroke I/O message channel 126 shown in FIG. 1. A keystroke 108 is received by the keystroke encryptor 114. In some examples, the keystroke 108 includes a key identifier comprising a scan code (e.g., an 8-bit integer generated by the keyboard device 106 of FIG. 1). In some examples, the key identifier comprises a virtual-key code (e.g., an 8-bit integer that is the results of a mapping of a scan code to the virtual-key code by the keyboard device driver 112). The keyboard device driver 112 generates a keystroke message 210 for each keystroke 108 that is received. In this example, the keystroke encryptor 114 generates and encrypts a keystroke cipher segment 240 that is embedded within the keystroke message 210 before the keystroke message 210 is sent through the message channel 126.

In the example shown in FIG. 2, the message channel 126 is a keystroke I/O message channel 126 native to certain versions of the Windows operating system. As such, the keystroke message 210 includes several predefined fields as a part of a message protocol for the message channel 126, including a Unit ID field 212 (as a USHORT of 2 bytes), a MakeCode field 214 (USHORT), a Flags field 216 (USHORT), a Reserved field 218 (USHORT), and an ExtraInformation field 220 (as a ULONG of 4 bytes) (e.g., as defined by a "KEYBOARD_INPUT DATA" object or structure. The MakeCode field 214 typically includes the key identifier (in plaintext) in unencrypted implementations. In encrypted implementations described herein, the Make-Code field 214 is intentionally left empty (zero value) and the key identifier is embedded as a key ID field 234 within a keystroke cipher segment 240 and that keystroke cipher segment is encrypted and included as the ExtraInformation field 220. The ExtraInformation field 220 thus represents a data channel between the keyboard device driver 112 and the window event handler 122 that is used to pass the key ID 234 in an encrypted state.

More specifically, and in a first example implementation, the keystroke encryptor 114 creates a 32-bit (4 bytes) keystroke cipher segment (or just "cipher segment") 240 that includes a random buffer field (or just "random buffer") 230 of 12 bits, a primary authentication code field (or just "primary auth code") 232 of 12 bits, and a key ID field (or just "key ID") 234 of 8 bits. The key ID 234, as mentioned above, is the plaintext key identifier received in the keystroke 108 (e.g., a scan code or virtual-key code mapped from the scan code). The random buffer 230 is a random 12 bits of data used to pad the size of the cipher segment 240 to be 32 bits (4 bytes), the size of the ExtraInformation field 220. The primary auth code 232 is a random number generated and shared between the encryptor 114 and the decryptor 124 as a part of shared cipher parameters 202 (SHARED_AUTH_CODE). As such, in this first example implementation, the primary auth code 232 is consistently used for all keystroke messages 210 between the encryptor 114 and the decryptor 124 (until the shared cipher parameters 202 are reset and renegotiated). This first example implementation is referred to herein as a "static authentication code" implementation. The primary auth code 232 is used by the decryptor 124 to authenticate that the keystroke message 210 was properly generated by the encryptor 114. While the random buffer field 230 and primary auth code field 232 are set to 12 bits in size in the example implementation, it should be understood that other widths between these two fields are possible (from 24 total bits), where more bits to the random buffer field 230 makes the cipher more secure against certain types of attacks (e.g., chosen-plaintext attack), and where more bits to the primary auth code field 232 provides a greater chance to detect faked ciphertext. Further, the fields 230, 232, 234 of the cipher segment 240 can be in any arbitrary order.

In a second example implementation, the primary auth code 232 differs from the first example implementation. This second example implementation is referred to herein as a "dynamic authentication code" implementation. More specifically, the primary auth code 232 is a 12-bit value that is generated for each particular keystroke message 210 in this second implementation. To create the primary auth code 232, the encryptor 114 creates a hash segment 250, a 32-bit value that includes a zeros field 252 of 4 bits, a shared auth code field 254 of 12 bits, a tag field (or just "tag") 256 of 8 bits, and a key ID field 258 of 8 bits. The zeros field is set to all zeros. The shared auth code field 254 is the shared authentication code, SHARED_AUTH_CODE, from the shared cipher parameters 202. The tag field 256 is an 8-bit value that is used to help verify whether the MakeCode field 214 of the keystroke message 210 has been tampered with or otherwise changed between encryption and decryption. The encryptor 114 selects a tag value for the tag field 256 (e.g., a random 8-bit value, an incrementing value, or the like). This tag value is also included as the MakeCode field 214 in the keystroke message 210 (in plaintext, zero padded). The encryptor 114 hashes the hash segment (e.g., using "triple32" hash function, or any other hash method that takes 32 bits as input and produces 32 bit hash values) to generate a 32-bit hash 260. This 32-bit hash 260 is converted into a 16-bit hash 262 (e.g., using XOR-folding). The lower 12 bits 264 of the 16-bit hash 262 are then used as the primary auth code 232 within the keystroke cipher segment 240 prior to encryption. The fields 252, 254, 256, 258 of the hash segment 250 can be in any arbitrary order.

In operation, the encryptor 114 creates the keystroke cipher segment 240 with either the first or second implementations as described above. The encryptor 114 then encrypts the cipher segment 240 using an encryption algorithm that can support encryption of a 4-byte message. In example implementations, the encryptor 114 uses Simon32 to encrypt the cipher segment 240. Simon32 is a variant of the Simon family of lightweight block ciphers made publicly available by the National Security Agency (NSA) and that supports 32-bit blocks. In other implementations, another block cipher that supports 32-bit blocks is used, such as RC5, Skip32, Spec32, or the like. The encrypted cipher segment 240 is included as the ExtraInformation field 220 of the keystroke message 210. As discussed above, the Make-Code field is empty in the static auth code implementation and is set to the tag value in the dynamic auth code implementation.

Upon receipt of the keystroke message 210, the decryptor 124 extracts the encrypted cipher segment 240 from the ExtraInformation field 220, and optionally the tag value from the MakeCode field 214. The decryptor 124 then decrypts the encrypted cipher segment 240 (using the shared cipher parameters). In the first example embodiment, if the decrypted primary auth code 232 matches the SHARED_ AUTH_CODE from the shared cipher parameters 202, then the message 210 is determined to be authentic, and thus the key ID 234 is extracted and passed along by the window event handler 122 to the active application 130. In the second example embodiment, the decryptor 124 verifies the message 210 by recreating the hash segment 250. In recreating the hash segment 250, zeros field is created with all zeros, the SHARED_AUTH_CODE is used for the shared auth code field 254, the value from the MakeCode field 214 of the message 210 is used as the tag field 256, and the unencrypted key ID field 234 of the cipher segment 240 is used as the key ID field 258. The resulting 32-bit hash 260 is converted to a 16-bit hash 262, and the lower 12 bits 264 are then compared to the primary auth code 232 from the unencrypted cipher segment 240. If these values match, then the message 210 is considered authentic (properly decrypted and a verified untampered MakeCode field), and thus the unencrypted key ID 234 is similarly extracted and passed along to the active application 130.

In example implementations, the shared cipher parameters 202 include a VERSION_NUMBER indicating a version of the encryption system, a KEY_GENERATION value indicating a counter identifying how many times the encryption system has regenerated, reset, or recreated some of these parameters, a KEY_ARRAY array of 32 64-bit keys (under Simon32) used by the encryption algorithm to perform encryption and decryption, a NUM_ROUNDS value of a random integer between 16 and 32, and a SHARED_AUTH_CODE whose use is described above. Other shared cipher parameters 202 may be included. The encryptor 114 and decryptor 124 share these cipher parameters 202 via some separate communications channel and periodically regenerate, reset, or recreate some of these parameters 202. For example, a reset event is initiated or performed by either of the encryptor 114 and decryptor 124 after a predetermined period of time (e.g., reset event automatically initiated every five minutes) or after a predetermined number of encryptions (e.g., reset event automatically initiated after every 1024 encryptions, as tracked internally by the encryptor), where quicker resets yields stronger security, but at a cost of computational processing.

In some implementations, the decryptor 124 maintains both a current set of cipher parameters 202 and a previous set of cipher parameters. There may be situations in which a new set of cipher parameters 202 may have been created and shared but some messages 210 that had been encrypted with the previous version of cipher parameters 202 may still be inbound to the decryptor 124. As such, if a decryption attempt fails with the current parameters 202, then the decryptor 124 may attempt to decrypt with the prior set of parameters 202, and only then may reject a message 210 if neither set of parameters 202 successfully authenticates the message 210.

Figure 3:
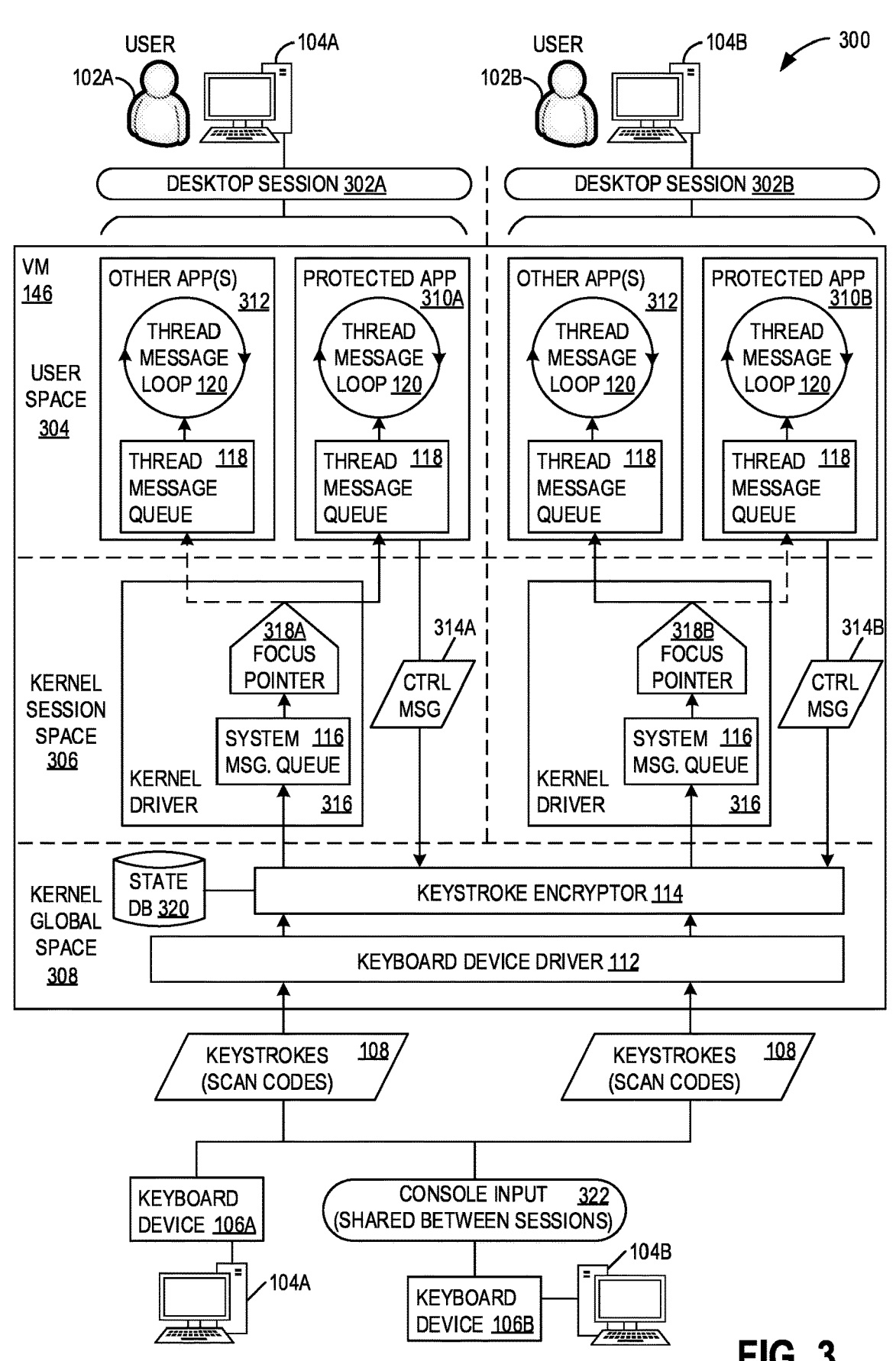
FIG. 3 is an architecture that advantageously provides encryption and decryption of keystroke data in multi-session-enabled computing systems.

FIG. 3 is an architecture 300 that advantageously provides encryption and decryption of keystroke data in multi-session-enabled computing systems. Architecture 300 uses computing devices 104A, 104B in conjunction with keyboard devices 106A, 106B which may be implemented on one or more computing apparatus 618 of FIG. 6. In some examples, the architecture 300 is similar to the architecture 100 of FIG. 1, performing keystroke encryption and decryption for computing devices 104A, 104B similar to the process described in FIG. 1, but with features that allow for the concurrent support of multiple sessions (e.g., "multi-session-enabled systems").

In the example architecture 300, a VM 146 provides two desktop sessions 302A, 302B (e.g., virtual desktops) for two users 102A, 102B via two computing devices 104A, 104B, respectively. Each of these computing devices 104A, 104B are depicted at the top of FIG. 3, for example as the target of the desktop sessions 302A, 302B, as well as at the bottom of FIG. 3, for example as the keyboard hardware (e.g., keyboard devices 106A, 106B, which are the source of keystrokes 108). In examples described herein, user 102A provides keystroke inputs with keyboard 106A via computing device 104A while controlling desktop session 302A, and user 102B provides keystroke inputs with keyboard device 106B via computing device 104B while controlling desktop session 302B and optionally one or more other desktop sessions (not shown), such as where keyboard device 106B is shared between multiple sessions, such as console input 322, but only actively providing input to one session at a time.

The VM 146 executes a single instance of an operating system (not separately shown) that is represented here by a user space 304, a kernel session space 306, and a kernel global space 308. In some examples, the operating system is operating system 110. User space 304 represents an area of the operating system where most user applications and processes run, being limited, for example, to perform certain operations within boundaries set by the operating system. Kernel session space 306 and kernel global space 308 are, together, the full "kernel space" of the operating system, or other privileged area of the operating system that generally has unrestricted access to system resources such as hardware devices, memory, and other such components. Kernel space can be further segmented here into kernel session space 306 and kernel global space 308, where kernel session space 306 refers to portions of the kernel's memory and resources that are allocated to a specific session, with all other kernel space being in kernel global space 308. User space 304 and kernel session space 306 are segmented by session (using vertical broken line in FIG. 3), as they contain and maintain some drivers and user-space applications separately between sessions 302A, 302B, where the components of the kernel global space 308 are shared between the sessions 302A, 302B. While this example architecture 300 depicts two desktop sessions 302A, 302B, it should be understood that the systems and methods described herein can be extended to any number of desktop sessions.

In this example, each of the desktop sessions 302A, 302B executes one protected application (or "protected app") 310A, 310B, respectively, as well as one or more unprotected applications (or "other app(s)") 312, all of which are executed in user space 304. The protected apps 310A, 310B represent applications that are configured to have their keystroke data encrypted (e.g., as described in FIG. 1), where the other apps 312 represent applications that do not have their keystroke data encrypted. In this example, each protected app 310A, 310B and each other app 312 includes a thread message queue 118 and thread message loop 120 as shown and described in FIG. 1, as well as a window event handler 122 (not shown in FIG. 3), for managing keystroke data passing through to the underlying application processes and threads. Further, while not shown in FIG. 3, each protected app 310A. 310B also includes a keystroke decryptor 124 that is configured to decrypt encrypted keystroke data (e.g., as described in FIG. 1).

Each desktop session 302A, 302B also includes kernel session space 306. In kernel session space 306, a kernel driver 316 provides the system message queue 116, which moves keystroke data from the keystroke encryptor 114 up to applications 130, such as the protected apps 310A, 310B and other apps 312A, 312B. The kernel driver 316 also manages a "focus pointer" 318A, 318B for each desktop session 302A, 302B, respectively. The focus pointer 318A.

318B identifies, for the particular desktop session 302A, 302B, which application currently has the "focus" for input data (e.g., keystroke data) coming from the keyboard device 106A, 106B of the session 302A, 302B. In other words, and using desktop session 302A as example, the focus pointer 318A identifies which one application (e.g., by window, process, thread, or the like), of all of the applications executing in user space 304 in that session 302A (either the protected app 310A or one of the other apps 312A in this example), is currently configured to receive keystroke data from the keyboard device 106A. As such, the focus pointer 318A changes between applications 310A. 312A, typically in response to user input such as bringing a particular application to the foreground in a user interface provided by the operating system (e.g., clicking on a main window of the application).

Kernel global space 308, in this example, includes the keyboard device driver 112 and keystroke encryptor 114 shown and described in FIG. 1. In this example, the keystroke encryptor 114 is configured to handle keystroke data passing from the keyboard device driver 112 and the system message queues 116 for each of the desktop sessions 302A. 302B. Further, and as further described herein, the keystroke encryptor is configured to encrypt keystroke data for a given session 302A. 302B when the keyboard focus of that session is directed to a protected application (e.g., protected app 310A, 310B) and to pass unencrypted keystroke data when the keyboard focus of the session is directed to an unprotected application (e.g., other apps 312).

The keystroke encryptor 114 uses a state database (DB) 320 for tracking whether and when to encrypt or to not encrypt keystroke data going to particular sessions 302A, 302B. More specifically, in this example, the keystroke encryptor 114 creates the state DB 320 when the keystroke encryptor 114 is first initialized, such as at boot time of the VM 146, at startup of the protected app 310A, 310B, or the like. The state DB 320 is configured to include three columns or fields of data for each row or record in the DB 320, namely a session identifier (ID), a process ID, and a thread ID. During operation, when a desktop session changes keyboard focus to a protected application (e.g., when desktop session 302A changes the focus pointer 318A to point at protected app 310A, as shown in FIG. 3), the protected application is configured to send a control message to the keystroke encryptor 114 indicating that keystroke encryption should be turned on for this session. For example, ctrl msg 314A is sent as an "encryption activation" message that activates keystroke encryption for desktop session 302A. Upon receipt of an encryption activation control message, the keystroke encryptor 114 identifies the session ID and process ID of the requesting application, as well as the thread ID of the thread in the client application that gets focus. In some examples, this data may be sent along with the ctrl msg 314A. 314B. In other examples, this data may be retrieved by operations performed by the keystroke encryptor, as described in further detail below. The keystroke encryptor 114 creates a row or record in the state DB 320 with this data (e.g., with the session ID, process ID, and thread ID of the protected app 310A). In the example embodiment, it is the presence of this row or record in the state DB 320 that identifies when the keystroke data for that particular session 302A is to be encrypted. In some examples, the kernel driver 316 may inform the protected app 310A when focus is changed to the protected app 310A (e.g., under certain versions of Windows OS, the kernel driver may send a WM_SETFOCUS message to the protected app 310A when focus is gained). This prompts the protected app 310A to send the encryption activation message to update the state DB 320.

While the protected app 310A has keyboard focus, the keystroke encryptor 114 encrypts keystroke data that is being passed through to that desktop session 302A. More specifically, during operation, the keystroke encryptor 114 receives a keystroke request message from the kernel driver 316. In some examples, this keystroke request message is an I/O request packet (IRP). In some examples, this keystroke request message may be similar to the keystroke message 210 of FIG. 2. The keystroke request message includes a specific keyboard device 106A from which to read a keystroke 108, the session ID of the desktop session 302A, and a place for the result (e.g., the "ExtraInformation" field 220 of the keystroke message 210, shown in FIG. 2). The keystroke encryptor 114 sends this keystroke request message through to the keyboard device driver 112, and the keyboard device driver 112 responds by reading and putting a scancode from the keyboard device 106A into a keystroke response message returned to the keystroke encryptor 114. The keystroke encryptor 114 receives the keystroke response message (e.g., unencrypted keystrokes 108) from the keyboard device 106A and identifies which desktop session 302A, 302B the keystroke 108 is intended for based on the session ID. In some examples, any particular keyboard device 106A. 106B is currently assigned to at most one desktop session 302A, 302B.

In the example, upon receiving the keystroke response message from the keyboard device driver 112, the keystroke encryptor 114 performs two checks to determine whether or not to encrypt the keystroke 108. More specifically, the keystroke encryptor 114 queries the kernel driver 316 to determine what application currently has focus within the particular session 302A (e.g., querying for the current application process/thread pointed to by the focus pointer 318A). After receiving the process ID and thread ID of the focus thread, the keystroke encryptor 114 then queries the state DB 320 by session ID, process ID, and thread ID. If no matching row is found, this means that the focus pointer 318A is not currently pointed at the protected app 310A and, as such, the keystroke encryptor 114 passes the keystroke 108 through to the system message queue 116 of the session 302A without encrypting the keystroke data. Instead, the focus pointer 318A is pointed at one of the other apps 312, or no app at all. If, however, a matching row is found, then the encryptor 114 has verified both that the protected app 310A has previously received focus (e.g., based on the row in the database), and that the current focus for the session 302A is still on that protected app 310A (e.g., based on the query to the kernel driver 316). As such, the keystroke encryptor 114 then encrypts that keystroke 108 (e.g., as described above in reference to FIG. 1 and FIG. 2) before passing the keystroke 108 up to the system message queue 116 of the session 302A.

When focus shifts away from the protected app 310A in a given session 302A, the state DB 320 is updated to delete the entry for that session, thus effectively turning off encryption for that session 302A. More specifically, when the focus pointer 318A shifts away from the protected app 310A to one of the other apps 312, the protected app 310A sends another a control message 314A to the keystroke encryptor 114 indicating that keystroke encryption should be turned off for this session. The ctrl msg 314A is sent as an "encryption deactivation" message that deactivates keystroke encryption for desktop session 302A. Upon receipt of an encryption deactivation control message, the keystroke encryptor 114 identifies the session ID and process ID of the requesting application, as well as the thread ID of the thread in the client application that is losing the focus. In some examples, this data may be sent along with the ctrl msg 314A. 314B, or may be retrieved by the keystroke encryptor 114. The keystroke encryptor 114 deletes any row or record in the state DB 320 having this session ID, process ID, and thread ID of the protected app 310A that is losing focus. In some examples, the kernel driver 316 may inform the protected app 310A when focus is being moved away. For example, under certain versions of Windows OS, the kernel driver may send a WM_KILLFOCUS message to the protected app 310A when focus is lost. This prompts the protected app 310A to send the encryption deactivation message to update the state DB 320.

In some situations, the protected app 310A may be terminated (e.g., ungracefully), and the protected app 310A may not have a chance to send an encryption deactivation control message 314A. As such, in some examples, the keystroke encryptor 114 is configured to monitor process creation and termination within the session(s) 302A, 302B and updates the state DB 320 when protected apps 310A, 310B are created or terminated. For example, the keystroke encryptor 114 may be configured to receive process creation or process termination messages that occur on the VM 146. For process termination events, the keystroke encryptor 114 deletes all rows from the state DB 320 having session ID/process ID/thread ID of the terminated processes/threads for that particular session.

In some examples, the underlying operating system of the VM 146 is a version of Microsoft Windows, such as Windows 10 or Windows 11. In such examples, the kernel driver 316 is the "Win32kbase" driver (or Win32k driver in some earlier versions). Under Windows 10, a per-session variable "gptiForeground" is defined and used to save and track the focus pointer 318A, and the contents of "gptiForeground" is directly readable by the keystroke encryptor 114 (e.g., performed when the keystroke encryptor 114 determines what application currently has focus within the particular session 302A, as referenced above). A "direct" process for reading the "gptiForeground" value directly (e.g., using an Export Address Table (EAT) of the Win32k driver) is described below. Under Windows 11, the "gptiForeground" variable has been hidden from the "Win32kbase" driver and thus is not directly accessible. An "indirect" process for reading the "gptiForeground" value (e.g., using dynamic opcode interpreter) is also described below.

In an example direct process for determining the "gptiForeground" value, the keystroke encryptor 114 awaits the start of the Win32k driver, as the keystroke encryptor 114 may be configured to start before the Win32k driver. The keystroke encryptor 114 monitors process creation and termination on the VM 146. When a process is created or terminated, the operating system notifies the keystroke encryptor 114. Once the keystroke encryptor 114 identifies that the Win32k driver has been started, the keystroke encryptor finds the address of the "gptiForeground" and "IsProcessForeground" from the Export Address Table (EAT) of the Win32k driver, which is an array of function pointers that contain the address of an exported function. These addresses are saved by the keystroke encryptor 114 and used when the keystroke encryptor 114 checks the focus pointer 318A of a particular session 302A. In some examples, the keystroke encryptor 114 acquires the address of "gptiForeground" and "IsProcessForeground" when the first session of the system (e.g., session 0) is created, and the OS provides a set of functions to read values at specific addresses of specific desktop sessions 302A, 302B. As such, the keystroke encryptor 114 uses such functions to read data of particular addresses within each session 302A, 302B (e.g., the values of focus pointers 318A, 318B) using the functions provided by the OS.

In an example indirect process for determining the "gptiForeground" value, the value of "gptiForeground" is read via a dynamic opcode (e.g., machine code) interpreter. The keystroke encryptor 114 first finds an address of the "IsProcessForeground" function in the "Win32kfull" driver (which is part of the "Win32k" driver in earlier versions of Windows). Using that address, the keystroke encryptor 114 scans the instruction opcode from the beginning of the "IsProcessForeground" function to the end of the function. Each instruction opcode is checked to determine if it starts with "E8", which means it is a CALL with a relative address. If not, the search continues through the function until "E8" is found (or produces an error if not found). When found, the keystroke encryptor 114 decodes the instruction opcode found at this location, retrieves the relative address from the instruction opcode, then converts the relative address to an absolute address. This absolute address is saved by the keystroke encryptor 114 as a function pointer, in this example it is named "pSGDFOREGROUNDgptiForeground". As such, each time the value of "gptiForeground" is needed, the keystroke encryptor 114 calls the function pointed to by the function pointer "pSGDFOREGROUNDgptiForeground". In some examples, the search continues after finding a first "E8" instruction opcode to search for a second "E8" opcode. When a second "E8" opcode is found, a second absolute address is similarly determined. This second absolute address should be the same as the first absolute address (otherwise produce an error if not found). As such, in this indirect example, an internal function "SGDFOREGROUNDgptiForeground" is configured to read and return the value of "gptiForeground". However, the "SGDFOREGROUNDgptiForeground" is an internal function that is not called directly because its address is initially unknown. The "IsProcessForeground" function calls the "SGDFOREGROUNDgptiForeground" function internally. Since the address of the "IsProcessForeground" function is known, the instruction opcode of the "IsProcessForeground" is used by the keystroke encryptor 114 to locate the relative address of the "SGDFOREGROUNDgptiForeground" function. This relative address is then converted into an absolute address, and then that "SGDFOREGROUNDgptiForeground" function may be called directly by the keystroke encryptor 114 to retrieve the value of "gptiForeground" (e.g., for determining the focus pointer 318A).

While only one protected app 310A, 310B is shown executing on each of the desktop sessions 302A, 302B, and while only two desktop sessions 302A, 302B are shown in this example, it should be understood that any number of desktop sessions can be supported by this architecture 100, and any number of protected apps or other apps 312 within each desktop session can be supported by this architecture 100 (e.g., including desktop sessions in which no protected apps are executed).

Figure 4:
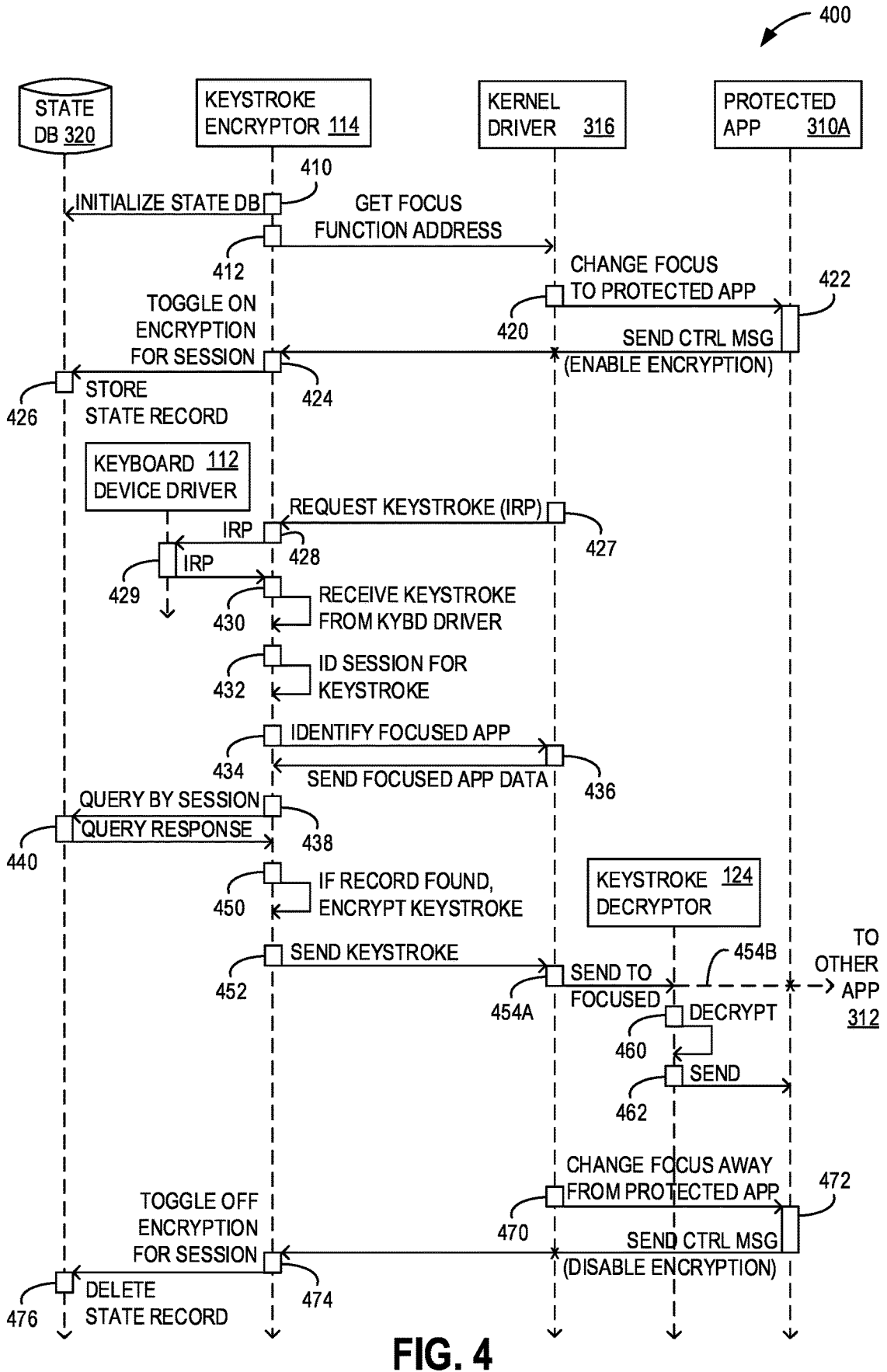
FIG. 4 is a sequence diagram that illustrates an example process for encrypting keystroke data within a multi-session-enabled architecture, such as that of FIG. 3.

FIG. 4 is a sequence diagram that illustrates an example process 400 for encrypting keystroke data within the multi-session-enabled architecture 300 of FIG. 3. In this example, operations 410-412 represent initialization steps performed by the keystroke encryptor 114, operations 420-426 represent steps to turn on encryption for the example protected app 310A, operations 427-462 represent steps to analyze new keystrokes and either encrypt or pass through the keystrokes unencrypted, and operations 470-476 represent steps to disable encryption for the protected app 310A. It should be noted that only the operations of the keystroke encryptor 114, state DB 320, kernel driver 316, and protected app 310A are shown for purposes of brevity, while operations of other components may be described or omitted for purposes of brevity.

In the example, the keystroke encryptor 114 performs initialization steps by initializing the state DB 320 at 410. Example initialization operations include forming an empty database, and an initial configuration in which no applications are yet configured for encryption. This operation 410 may be performed at boot time of the VM 146 or otherwise, such as when the keystroke encryptor 114 is started or restarted. In some examples, at 412, the keystroke encryptor 114 gets an address of a function that, when later executed by the keystroke encryptor 114, returns a current value of the focus pointer(s) 318A, 318B. The function is used to identify which process/thread has keyboard input focus within a given desktop session 302A, 302B, via the direct or indirect processes described above in reference to FIG. 3. The encryptor 114 may delay execution of operation 412 until the kernel driver 316 is active. This may occur in situations where the encryptor 114 is started before the kernel driver 316 during boot and startup of the VM 146. After operation 412, the keystroke encryptor 114 is presumed active and ready for steady state operation, in which the encryptor 114 will begin encrypting keystrokes for protected apps 310A, 310B whenever they have keyboard focus within their own desktop sessions 302A, 302B, and passing keystroke data through unencrypted for all other apps 312 whenever any other unprotected applications have keyboard focus.

Whenever a protected application, such as protected app 310A. 310B, receives keyboard focus within the respective desktop session 302A, 302B, keystroke encryption is enabled. Operations 420-426 illustrate an example keyboard focus event in which the protected app 310A acquires keyboard focus. For this example, presume that the protected app 310A is already running within a backgrounded window within the desktop session 302A and the user 102A brings the protected app 310A to the foreground such as via a mouse click input onto the primary window of the protected app 310A, or the like. As such, the desktop session 302A changes the window of the protected app 310A to be the foreground window and redirects keyboard input to that foreground window, as is known in the art.

In this example, when the focus is changed to the protected app 310A, the kernel driver 316 changes the focus pointer 318A of that desktop session 302A to point at the protected app 310A at 420 and no longer at whatever other app 312 the pointer 318A may have previously been pointing. Operation 420 includes the kernel driver 316 updating the focus pointer 318A to indicate the protected app 310A, as is shown in FIG. 3. The protected app 310A identifies that the keyboard focus has been changed to point at the protected app 310A, such as via receipt of a message or signal from the OS or kernel driver 316, such as WM_SETFOCUS in certain versions of Windows, or the like. As such, the protected app 310A creates a control message 314A to enable encryption and sends that control message 314A to the keystroke encryptor 114 at 422. The control message 314A may include session identification information such as the desktop session ID of the desktop session 302A and application identification information such as the process ID and/or thread ID of the protected app 310A. At 424, the keystroke encryptor 114 turns on or toggles on encryption for the protected app 310A in response to the receipt of the control message 314A. In this example, a new state record is stored in the state DB 320 at 426, and includes the session ID of the desktop session 302A, and the process ID and thread ID of the protected app 310A. As such, while the protected app 310A maintains focus within the desktop session 302A, keystroke data sent to the protected app 310A will be encrypted by the keystroke encryptor 114.

While the protected app 310A has keyboard focus, the keystroke encryptor 114 encrypts keystroke data being passed through to that session 302A. More specifically, in this example, the keystroke encryptor 114 receives a keystroke request message (e.g., an IRP) from the kernel driver 316 at 427. At 428, the keystroke encryptor 114 sends the keystroke request message through to the keyboard device driver 112 associated with the keyboard device 106A of the requesting desktop session 302A. At 329, the keyboard device driver 112 sends a keystroke response message (e.g., an IRP, a keystroke message 210) to the keystroke encryptor 114 with an unencrypted keystroke 108 (e.g., scancode) read from the keyboard device 106A identified in the keystroke request message. The keystroke encryptor 114 receives the keystroke response message from the keyboard device driver 112 at 430. At 432, the keystroke encryptor 114 identifies which session 302A, 302B this particular keystroke 108 is targeting. In some examples, the keystroke encryptor 114 or the keyboard device driver 112 may maintain a keyboard-to-session mapping for each keyboard 106A, 106B, thus allowing the keystroke encryptor 114 to identify which session 302A, 302B the keystroke 108 is for based on which keyboard 106A. 106B generated the keystroke 108.

At operations 434-440, the keystroke encryptor 114 makes two checks to determine whether or not to encrypt this current keystroke 108, namely a focus check with the kernel driver 316 to identify what application currently has focus within the targeted session 302A, and a query to the state DB 320 to determine if the currently-focused application has a record in the database, indicating that it is a protected app 310A and thus should have keystroke encryption enabled. More specifically, the encryptor 114 identifies the focused app at 434. In some examples, the encryptor 114 executes the direct or indirect process for identifying the state of the focus pointer 318A for this desktop session 302A, thus returning the process ID and thread ID of the protected app 310A at 436 because the protected app 310A still has the keyboard focus in this example. At this stage, the encryptor 114 has the session ID, process ID, and thread ID of whatever application currently has keyboard focus within the desktop session 302A targeted by this example keystroke 108. As such, the keystroke encryptor 114 then submits a search query to the state DB 320 at 438 using the session ID, process ID, and thread ID, with a query response at 440, whether or not there is a row matching that search criteria.

In this example, if a matching row is found in the above operations, then the keystroke 108 is encrypted at 450, such as described in FIG. 1 and FIG. 2. If no matching row is found, then the keystroke 108 will not be encrypted, and will be left unchanged as it is bound for some other app 312. At 452, the keystroke encryptor 114 sends the keystroke 108, as an encrypted keystroke 108 for this particular example keystroke, to the kernel driver 316 for the targeted desktop session 302A. The kernel driver 316 sends the keystroke 108 to the application that currently has the keyboard focus (e.g., based on focus pointer 318A), which is the protected app 310A in this example. As such, the protected app 310A has a keystroke decryptor 124 that receives the keystroke 108 being sent at 454A and decrypts the keystroke 108 at 460 before sending the now-unencrypted keystroke data through to the underlying application of the protected app 310A at 462. In situations where unencrypted keystrokes 108 are being sent by the kernel driver 316 to other apps 312 not protected by keystroke encryption, those other apps 312 do not have the keystroke decryptor 124, and thus the keystrokes 108 are sent directly through to the other apps 312 at 454B which is represented in FIG. 4 in horizontal broken arrow line, e.g., in lieu of 454A. As such, the encrypted keystroke 108 has passed from the keystroke encryptor 114 through to the keystroke decryptor 124 in encrypted form, being decrypted only once it is at the protected application 310A.

Simultaneously, or otherwise while the protected app 310A maintains keyboard focus in desktop session 302A, it should be noted that other keystroke data can be received and processed by the keystroke encryptor 114 for other desktop sessions, such as desktop session 302B, and those other keystrokes 108 may or may not be encrypted, depending on the state of that other session 302B.

In an example, desktop session 302B currently has one of the other apps 312 maintaining keyboard focus of its assigned keyboard (e.g., as shown in FIG. 3 by focus pointer 318B). As such, even though the encryptor 114 is currently encrypting keystrokes for desktop session 302A, any keystrokes 108 received from the keyboard device 106B of desktop session 302B will not be encrypted by the keystroke encryptor 114, but will rather be passed through to that desktop session 302B and to the other app 312 identified by the focus pointer 318B. The keystroke encryptor 114 follows the same operations of 430-462, as shown in FIG. 4, but it should be noted that the query 438 and response 440 for keystrokes 108 targeting the other desktop session 302B will fail to find any records because there is no record in the state DB 320 matching the other app 312 pointed to by the focus pointer 318B, because it is not a protected app 310B. As such, those keystrokes 108 going to the other desktop session 302B will not get encrypted at 450. And similarly, since the unencrypted keystrokes 108 are bound for one of the other apps 312, and since those other apps 312 do not have a keystroke decryptor 124, the kernel driver 316 sends the unencrypted keystrokes 108 directly through to the other app 312 at 454B.

In this example, the protected app 310A loses keyboard focus at some point and keystroke encryption is disabled when that occurs. If the user 102A brings one of the other apps 312 to the foreground such as via a mouse click input onto the primary window of one of the other apps 312, the protected app 310A is minimized, or the like, causing the protected app 310A to lose keyboard focus. In this example, when the focus is changed away from the protected app 310A, the kernel driver 316 changes the focus pointer 318A of that desktop session 302A to point away from the protected app 310A at 470. Operation 470 includes the kernel driver 316 updating the focus pointer 318A to no longer indicate the protected app 310A and instead points at one of the other apps 312. The protected app 310A identifies that keyboard focus has been changed away from the protected app 310A such asvia receipt of a message or signal from the OS or kernel driver 316, such as WM_KILLFOCUS in certain versions of Windows, or the like. As such, the protected app 310A creates another control message 314A to disable encryption and sends that control message 314A to the keystroke encryptor 114 at 472. The control message 314A may include session identification information such as the desktop session ID of the desktop session 302A and application identification information such as the process ID and/or thread ID of the protected app 310A. At 474, the keystroke encryptor 114 turns off or toggles off encryption for the protected app 310A in response to the receipt of the control message 314A. In this example, an existing state record is deleted from the state DB 320 at 476 using the session ID, process ID, and thread ID as deletion criteria. As such, any new incoming keystrokes 108 for the desktop session 302A will no longer be encrypted by the keystroke encryptor 114 until the protected app 310A reacquires focus within the desktop session 302A.

In some situations, the protected app 310A may terminate while the protected app 310A was in the foreground (e.g., while encryption was enabled at the keystroke encryptor 114) and without being able to send a control message 314A to disable encryption. In the example process 400 of FIG. 4, it should be noted that this process 400 will gracefully handle such a situation. At the time of termination of the protected app 310A, the kernel driver 316 updates the focus pointer 318A to point away from the protected app 310A and instead to one of the other apps 312 or to no application. When the encryptor 114 performs operations 434-440, no matching row will be found. This is because, while there may still be a row in the state DB 320 identifying the (now defunct) process ID and thread ID of the prior instance of the protected app 310A, the query into the focus pointer 318A will not provide that defunct process ID/thread ID, and thus the query into the state DB 320 will not find the row. As such, no keystroke encryption will happen until the protected app 310A is restarted and reacquires focus. In some examples, the kernel driver 316 may alert the keystroke encryptor 114 when processes start or terminate, or the keystroke encryptor 114 may otherwise monitor the running state of processes and threads in the state DB 320, and as such may delete rows from the state DB 320 when processes/threads terminate.

While session ID, process ID, and thread ID (example "application identification data") are used in these examples to uniquely identify a particular application within a session, other examples may use just session ID and process ID, or just session ID. For example, a session-based toggle for encryption may be performed without use of process ID and thread ID. When the control message at 424 is received to toggle on encryption for the protected app 310A, the encryptor 114 may toggle on encryption for the session 302A by storing or otherwise identifying only the session ID to have encryption enabled without regard to the process/application that enabled it. In such examples, the encryptor 114 may not perform operations 434, 436 and may simply proceed with the query of the state DB 320 using only the session ID of the keystroke 108. In other words, keystroke encryption is considered "on" for the session so long as it has been enabled (e.g., has a row with the session ID in the state DB 320) and has not yet been disabled, without inspection of the current state of the focus pointer 318A. Encryption will similarly be disabled when the protected app sends the "off" signal through another control message 314A at 472, 474.

FIG. 5 illustrates a flowchart 500 of exemplary operations associated with architecture 300 shown in FIG. 3. In some examples, the operations of flowchart 500 are performed by the keystroke encryptor 114 executing on the VM 146 of FIG. 1 and FIG. 3, or on the computing apparatus 618 of FIG. 6. Flowchart 500 commences at operation 510 with the encryptor 114 receiving a first control message 314A requesting enabling of keystroke encryption for a protected application 310A executing in a first desktop session 302A. The first control message 314A includes application identification information of the protected application. In some examples, the first control message 314A is generated by the protected application 310A based on acquisition of keyboard focus by the protected application 310A within the first desktop session 302A. In some examples, the application identification information includes one or more of a session ID, a process ID, and a thread ID. At operation 520, the encryptor 114 enables keystroke encryption for keystrokes targeting the first desktop session 302A based on receipt of the first control message 314A. In some examples, the encryptor 114 stores a record in a memory including at least some of the application identification information of the protected application at operation 522.

In the example, at operation 530, the encryptor 114 encrypts keystroke data sent to the protected application while the protected application maintains keyboard focus in the first desktop session. In some examples, the method includes receiving a keystroke 108 from a keyboard device 106A at operation 532 and identifying that the keystroke 108 is targeting the first desktop session 302A based on an assignment of the keyboard device 106A to the first desktop session at operation 534, and wherein encrypting keystroke data includes encrypting keystroke data when the keystroke targets the first desktop session. In some examples, the method includes identifying an application that currently has keyboard focus within the first desktop session 302A at operation 536 (e.g., via querying for the value of the focus pointer 318A). Encrypting keystroke data at operation 530 includes encrypting keystroke data when the protected application is the application currently having keyboard focus within the first desktop session, such as when the protected app 310A is verified as having the current keyboard focus, based on the current state of the focus pointer 318A at operation 538. In some examples, the method includes, upon receipt of a keystroke for the first desktop session, searching the memory for the record using a session identifier of the first desktop session at operation 540, wherein encrypting keystroke data includes encrypting a scan code of the keystroke when the searching finds the record in the memory at operation 542.

At operation 550, the encryptor 114 transmits unencrypted keystroke data to another application of a second desktop session, such as one of the other apps 312 of the desktop session 302B, while keystroke encryption is enabled for the protected application 310A. In some examples, the method includes receiving a second control message requesting disabling of keystroke encryption for the protected application 310A executing in the first desktop session 302A and disabling keystroke encryption for keystrokes targeting the first desktop session 302A based on receipt of the second control message.

Additional Examples

An example method of encrypting keystroke data in a multi-session-enabled computing device comprises: receiving a first control message requesting enabling of keystroke encryption for a protected application executing in a first desktop session, the first control message including application identification information of the protected application; enabling keystroke encryption for keystrokes targeting the first desktop session based on receipt of the first control message; encrypting keystroke data sent to the protected application while the protected application maintains keyboard focus in the first desktop session; and transmitting unencrypted keystroke data to another application of a second desktop session while keystroke encryption is enabled for the protected application in the first desktop session.

An example computer system comprises: a plurality of keyboard devices, each keyboard device of the plurality of keyboard devices being one of a physical keyboard device and a virtual keyboard device; a memory storing state data, the state data identifying encryption settings for desktop sessions provided by the computer system; a processor; and a non-transitory computer readable medium having stored thereon program code executable by the processor, the program code causing the processor to: receive, from a protected application executing in a first desktop session, a first control message requesting enabling of keystroke encryption, the first control message including application identification information of the protected application; enable keystroke encryption for keystrokes directed to the first desktop session based on receipt of the first control message; encrypt keystroke data sent to the first desktop session while keystroke encryption is enabled for the first desktop session; and transmit unencrypted keystroke data to another application of a second desktop session while keystroke encryption is enabled for the first desktop session.

An example non-transitory computer storage medium has stored thereon program code executable by a processor, the program code embodying a method comprising: receiving a first control message requesting enabling of keystroke encryption for a protected application executing in a first desktop session, the first control message including application identification information of the protected application; enabling keystroke encryption for keystrokes targeting the first desktop session based on receipt of the first control message; encrypting keystroke data sent to the protected application while the protected application maintains keyboard focus in the first desktop session; and transmitting unencrypted keystroke data to another application of a second desktop session while keystroke encryption is enabled for the protected application in the first desktop session.

Another example computer system comprises: a processor; and a non-transitory computer readable medium having stored thereon program code executable by the processor, the program code causing the processor to perform a method disclosed herein. Another example non-transitory computer storage medium has stored thereon program code executable by a processor, the program code embodying a method disclosed herein.

Alternatively, or in addition to the other examples described herein, examples include any combination of the following:

receiving a control message requesting enabling of keystroke encryption for a protected application executing in a first desktop session;

a control message including application identification information of the protected application;

enabling keystroke encryption for keystrokes targeting the first desktop session based on receipt of the first control message;

encrypting keystroke data sent to the protected application while the protected application maintains keyboard focus in the first desktop session;

transmitting unencrypted keystroke data to another application of a second desktop session while keystroke encryption is enabled for the protected application in the first desktop session;

identifying an application currently having keyboard focus within the first desktop session;

encrypting keystroke data when the protected application is the application currently having keyboard focus within the first desktop session;

storing a record in a memory including at least some of the application identification information of the protected application;

upon receipt of a keystroke for the first desktop session, searching the memory for the record using a session identifier of the first desktop session;

searching the memory for the record using a session identifier of the first desktop session;

encrypting a scan code of the keystroke when the searching finds the record in the memory;

receiving a keystroke from a keyboard device;

identifying that the keystroke is targeting the first desktop session based on an assignment of the keyboard device to the first desktop session;

encrypting keystroke data when the keystroke targets the first desktop session;

a control message was generated by the protected application based on acquisition of keyboard focus by the protected application within the first desktop session;

receiving a second control message requesting disabling of keystroke encryption for the protected application executing in the first desktop session;

disabling keystroke encryption for keystrokes targeting the first desktop session based on receipt of the second control message;

application identification information includes a session identifier, a process identifier, and a thread identifier;

a kernel driver managing keyboard focus for physical and/or virtual keyboards of desktop sessions provided by a virtual machine;

acquiring an address of a function configured to provide a response identifying an application currently having keyboard focus for a desktop session;

initializing and managing a state database that tracks a state of encryption for sessions, processes, or threads;

adding or deleting records from a state database when keystroke encryption is enabled or disabled, respectively;

a keystroke encryptor configured to encrypt keystrokes for some protected applications while concurrently providing unencrypted keystrokes for other applications;

a keystroke decryptor configured to decrypt encrypted keystroke data;

installing and executing a keystroke encryption module in conjunction with a keyboard device driver;

installing and executing a keystroke decryption module in conjunction with a window event handler;

resetting shared cipher parameters;

creating new key arrays for Simon32 encryption (or other 32 bits block encryption algorithms);

randomly generating a number between 16 and 32 to run Simon32 encryption (or other 32 bits block encryption algorithms) that number of times;

incrementing a counter configured to count a number of times keys have been generated;

sharing cipher parameters between partner encryption module and decryption module;

receiving a new keystroke that includes keystroke data;

receiving keystroke data that includes one or more of a scan code and a virtual-key code;

inserting one or more of a key identifier, a randomly generated value, and an authentication code in a plaintext cipher segment;

assembling a hash segment that includes one or more of: any number of zeros, an authentication code, a tag value, and a key identifier;

hashing a data segment using triple32 (or other hash algorithms that give a 32 bits result);

XOR-folding a data segment (or other folding method);

using a number of least significant bits of a data segment as an authentication code;

encrypting a cipher segment;

embedding an encrypted cipher segment as any field in a keystroke message;

transmitting a keystroke message through a keystroke I/O message channel native to an operating system;

performing one or more dummy encryption operations;

retaining two or more copies of the most recent cipher parameters;

receiving a key identifier (ID) from a keyboard device, the key ID representing a keystroke event occurring on the computing device via the keyboard device;

creating a keystroke cipher segment comprising a primary authentication code and a key ID;

encrypting a keystroke cipher segment to generate an encrypted keystroke cipher segment;

creating a keystroke message comprising at least a encrypted keystroke cipher segment;

transmitting a keystroke message from a keyboard device driver to a window event handler via an input/output (I/O) message channel native to an operating system running on the computing device;

an operating system including one of Microsoft Windows, Apple MacOS, Google ChromeOS, Apple iOS, linux, unix;

a window event handler that is responsible for providing keystroke data to applications running on the operating system;

receiving a keystroke message at the window event handler;

decrypting one or more portions of the encrypted keystroke cipher segment at the window event handler;

transmitting a key ID to a first application;

storing an encrypted keystroke cipher segment in a preexisting field provided by a I/O message channel;

a preexisting field provided by an I/O message channel (e.g., an ExtraInformation field defined by a keyboard input data object);

a preexisting field is four bytes in size;

an encrypted keystroke cipher segment is four bytes in size;

encrypting a keystroke cipher segment is performed by an encryption module integrated with the keyboard device driver;

encrypting the keystroke cipher segment using Simon32 encryption algorithm;

a primary authentication code includes a shared authentication code that is known by both an encryption module configured to perform the encrypting of the keystroke cipher segment and a decryption module configured to perform the decrypting of the encrypted keystroke cipher segment, the method further comprising authenticating the keystroke message by the decryption module using the shared authentication code.

Exemplary Operating Environment

The present disclosure is operable with a computing device (computing apparatus) according to an embodiment shown as a functional block diagram 600 in FIG. 6. In an embodiment, components of a computing apparatus 618 is implemented as part of an electronic device according to one or more embodiments described in this specification. The computing apparatus 618 comprises one or more processors

619 which may be microprocessors, controllers, or any other suitable type of processors for processing computer executable instructions to control the operation of the electronic device. Alternatively, or in addition, the processor 619 is any technology capable of executing logic or instructions, such as a hardcoded machine. Platform software comprising an operating system 620 or any other suitable platform software may be provided on the computing apparatus 618 to enable application software 621 to be executed on the device. According to an embodiment, the operations described herein are accomplished by software, hardware, and/or firmware.

Computer executable instructions may be provided using any computer-readable medium (e.g., any non-transitory computer storage medium) or media that are accessible by the computing apparatus 618. Computer-readable media may include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, hard disks, RAM, ROM, EPROM, EEPROM, NVMe devices, persistent memory, phase change memory, flash memory or other memory technology, compact disc (CD, CD-ROM), digital versatile disks (DVD) or other optical storage, magnetic cassettes, magnetic tape, magnetic disk storage, shingled disk storage or other magnetic storage devices, or any other non-transmission medium (c., non-transitory) that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623). Computer storage media are tangible, non-transitory, and are mutually exclusive to communication media.

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone, or a touchpad. In one embodiment, the output device 625 may also act as the input device. An example of such a device is a touch sensitive display. The input/output controller 624 may also output data to devices other than the output device, e.g. a locally connected printing device. In some embodiments, a user provides input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUS).

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising." "including." and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method of encrypting keystroke data in a multi-session-enabled computing device, the method comprising:

maintaining, by a keyboard device driver executing in a kernel global space on the multi-session-enabled computing device, a keyboard-to-session mapping that maps a first keyboard device of a first computer to a first desktop session and a second keyboard device of a second computer to a second desktop session;

receiving a first control message requesting enabling of keystroke encryption for a protected application executing in the first desktop session, the first control message including application identification information of the protected application;

enabling the keystroke encryption for keystrokes targeting the first desktop session based on receipt of the first control message by storing, in a state database residing in the kernel global space, a state record associated with the first desktop session and identifying the protected application;

receiving keystroke data at a keyboard device driver from the first keyboard device and the second keyboard device;

determining, based on the keyboard-to-session mapping that the keystroke data is directed to the first or the second desktop session;

in response to determining that (i) the state record for the first desktop session is present in the state database and that (ii) the protected application identified in the state database has current keyboard focus in the first desktop session at the time of receiving the keystroke data, encrypting the keystroke data sent to the protected application in the first desktop session while the protected application maintains the keyboard focus in the first desktop session; and transmitting the keystroke data sent to another application of the second desktop session in an unencrypted form while the keystroke encryption is enabled for the protected application in the first desktop session.

2. The computer-implemented method of claim 1, wherein the first control message was generated by the protected application based on acquisition of the keyboard focus by the protected application within the first desktop session.

3. The computer-implemented method of claim 1, further comprising:

receiving a second control message requesting disabling of the keystroke encryption for the protected application executing in the first desktop session; and disabling the keystroke encryption for keystrokes targeting the first desktop session based on receipt of the second control message.

4. The computer-implemented method of claim 1, wherein the application identification information includes a session identifier, a process identifier, and a thread identifier.

5. The computer-implemented method of claim 1, wherein determining that the protected application has current keyboard focus in the first desktop session comprises querying, by a kernel driver associated with the first desktop session, a focus pointer that identifies a thread currently designated to receive keyboard input within the first desktop session, and matching the thread to the application identification information stored in the state record.

6. A computer system comprising:

a processor; and a non-transitory computer readable medium having stored thereon program code executable by the processor, the program code causing the processor to:

maintain, by a keyboard device driver executing in a kernel global space on a multi-session-enabled computing device, a keyboard-to-session mapping that maps a first keyboard device of a first computer to a first desktop session and a second keyboard device of a second computer to a second desktop session;

receive, from a protected application executing in the first desktop session, a first control message requesting enabling of keystroke encryption, the first control message including application identification information of the protected application;

enable the keystroke encryption for keystrokes directed to the first desktop session based on receipt of the first control message by storing, in a state database residing in the kernel global space, a state record associated with the first desktop session and identifying the protected application;

receive keystroke data at a keyboard device driver from the first keyboard device and the second keyboard device;

determine, based on the keyboard-to-session mapping that the keystroke data is directed to the first or the second desktop session;

in response to determining that (i) the state record for the first desktop session is present in the state database and that (ii) the protected application identified in the state database has current keyboard focus in the first desktop session at the time of receiving the keystroke data, encrypt the keystroke data sent to the first desktop session while the keystroke encryption is enabled for the first desktop session; and transmit the keystroke data sent to another application of the second desktop session in an unencrypted form while the keystroke encryption is enabled for the protected application in the first desktop session.

7. The computer system of claim 6, wherein the first control message was generated by the protected application based on acquisition of the keyboard focus by the protected application within the first desktop session.

8. The computer system of claim 6, wherein the program code further causes the processor to:

receive a second control message requesting disabling of the keystroke encryption for the protected application executing in the first desktop session; and disable the keystroke encryption for keystrokes targeting the first desktop session based on receipt of the second control message.

9. The computer system of claim 6, wherein the application identification information includes a session identifier, a process identifier, and a thread identifier.

10. The computer system of claim 6, wherein determining that the protected application has current keyboard focus in the first desktop session comprises querying, by a kernel driver associated with the first desktop session, a focus pointer that identifies a thread currently designated to receive keyboard input within the first desktop session, and matching the thread to the application identification information stored in the state record.

11. A non-transitory computer-readable storage medium having stored thereon program code executable by a processor, the program code embodying a method comprising:

maintaining, by a keyboard device driver executing in a kernel global space on a multi-session-enabled computing device, a keyboard-to-session mapping that maps a first keyboard device of a first computer to a first desktop session and a second keyboard device of a second computer to a second desktop session;

receiving a first control message requesting enabling of keystroke encryption for a protected application executing in the first desktop session, the first control message including application identification information of the protected application;

enabling the keystroke encryption for keystrokes targeting the first desktop session based on receipt of the first control message by storing, in a state database residing in the kernel global space, a state record associated with the first desktop session and identifying the protected application;

receiving keystroke data at a keyboard device driver from the first keyboard device and the second keyboard device;

determining, based on the keyboard-to-session mapping that the keystroke data is directed to the first or the second desktop session;

in response to determining that (i) the state record for the first desktop session is present in the state database and that (ii) the protected application identified in the state database has current keyboard focus in the first desktop session at the time of receiving the keystroke data, encrypting the keystroke data sent to the protected application in the first desktop session while the protected application maintains the keyboard focus in the first desktop session; and transmitting the keystroke data sent to another application of the second desktop session in an unencrypted form while the keystroke encryption is enabled for the protected application in the first desktop session.

12. The non-transitory computer-readable storage medium of claim 11, wherein the first control message was generated by the protected application based on acquisition of the keyboard focus by the protected application within the first desktop session.

13. The non-transitory computer-readable storage medium of claim 11, wherein the method further comprises:

receiving a second control message requesting disabling of the keystroke encryption for the protected application executing in the first desktop session; and disabling the keystroke encryption for keystrokes targeting the first desktop session based on receipt of the second control message.

14. The non-transitory computer-readable storage medium of claim 11, wherein determining that the protected application has current keyboard focus in the first desktop session comprises querying, by a kernel driver associated with the first desktop session, a focus pointer that identifies a thread currently designated to receive keyboard input within the first desktop session, and matching the thread to the application identification information stored in the state record.

* * * * *